United States Patent [19]
Tusé et al.

[11] Patent Number: 5,344,471
[45] Date of Patent: Sep. 6, 1994

[54] PLANT ROOT COATINGS

[75] Inventors: Daniel Tusé, Fremont; Leslie A. Hokama, Mountain View; Carrie R. Foss, Sunnyvale; Jacqueline A. Tefft, Santa Cruz, all of Calif.

[73] Assignee: SRI International, Menlo Park, Calif.

[21] Appl. No.: 432,690

[22] Filed: Nov. 7, 1989

Related U.S. Application Data

[63] Continuation-in-part of Ser. No. 271,550, Nov. 15, 1988.

[51] Int. Cl.$^5$ .............................................. A01H 5/00
[52] U.S. Cl. ............................................... 47/58; 71/6; 424/93.5; 427/4; 800/200
[58] Field of Search ............. 47/1.1, 57.6, 58, DIG. 2, 47/DIG. 11, 59, 74, 77, 58.01, 58.13, 58.14, 58.18; 71/88, 71, 6; 111/100; 800/200; 424/93, 93 Q; 427/4

[56] References Cited

U.S. PATENT DOCUMENTS

| | | | |
|---|---|---|---|
| 2,270,046 | 1/1942 | Grace | 47/DIG. 3 |
| 3,157,964 | 11/1964 | Ferguson et al. | 427/4 |
| 3,328,916 | 7/1967 | Okita et al. | 47/56 |
| 3,808,740 | 5/1974 | Porter et al. | 427/4 |
| 4,291,497 | 9/1981 | Manankov | 47/58 |
| 4,479,936 | 10/1984 | Vandenbergh et al. | 424/93 |
| 4,550,527 | 11/1985 | Hall et al. | 47/58 |
| 4,583,320 | 4/1986 | Redonbaugh | 47/58 |
| 4,589,225 | 5/1986 | Stensaas | 47/57.6 |
| 4,756,922 | 7/1988 | Motoyama et al. | 47/DIG. 11 |
| 4,975,105 | 12/1990 | Kremer et al. | 47/57.6 X |

FOREIGN PATENT DOCUMENTS 3240726 11/1987 Japan ..................................... 47/1.1

OTHER PUBLICATIONS

Anon. *ATCC Catalogue of Fungi/Yeasts,* 17th Edition, 1987 p. 179.
Siqueira, J. O., et al., (1982) *Mycologia* 74:952–959.
Burggraaf, A. J. P., et al., (1989) *New Phytol* 111: 25–33.

*Primary Examiner*—James R. Feyrer
*Attorney, Agent, or Firm*—Morrison & Foerster

[57] ABSTRACT

Non-phytotoxic roots coating compositions comprising a polymer, VAM propagules, and a fungicide that selectively inhibits pathogenic fungi are provided. Also provided are methods of coating plant roots with the aforesaid composition and plants comprising roots coated with a polymer containing VAM propagules and a fungicide.

In an alternative approach, the roots are first rolled in a dried polymer composition and then dipped in a suspension of VAM propagules, or attached to a film which is a dried polymer containing a spore suspension.

14 Claims, No Drawings

PLANT ROOT COATINGS

CROSS-REFERENCE TO RELATED APPLICATION

This application is a continuation-in-part of U.S. Ser. No. 271,550 filed 15 Nov. 1988 and now pending.

TECHNICAL FIELD

The present invention is directed to growth-promoting coatings of plant roots. More particularly, the present invention is directed to polymeric coatings that promote the infection or colonization of plant root tissue by beneficial microorganisms, while also selectively inhibiting infection by pathogenic microorganisms.

BACKGROUND OF THE INVENTION

Vesicular arbuscular mycorrhizal (VAM) fungi enter into a beneficial symbiotic relationship with many plants. These fungi confer on the host plant resistance to plant pathogens and aid the plant in obtaining nutrients, particularly phosphorous, from the soil. Many of the crops capable of forming beneficial symbiotic relationships with VAM fungi are susceptible to common pathogenic fungi found in the rhizosphere.

A typical way of treating soil infected with pathogenic fungi or other pathogens is to treat the field in its entirety with a fungicide or fumigants. The most common techniques of fumigation, with agents such as methyl bromide, eliminate VAM fungi as well as the plant pathogens. Furthermore, serious health and safety concerns about these fumigants have recently arisen which may lead to a ban or severe restriction on continued use. Unfortunately, many of the fungicides which could replace the fumigants would be prohibitively expensive for application to an entire field.

Various methods of effecting beneficial infection by VAM fungi have been disclosed. For example, Nemec, *Trop. Agric.* (Trinidad) (1983) 60:97-101 describes the inoculation of citrus seedlings by dipping plant roots in an inoculum comprised of VAM fungi and a sticking agent, and the effect of various fumigants and fungicides on VAM fungi has been studied. See, e.g., Menge, *Phytopathology* (1982) 72:1125-1132; Nemec, *Can. J. Bot.* (1980) 58:522-526. In addition, Johnson, C. R. et al., *J. Environ Hort* (1985) 3:166-168 report the use of hydrophilic polymers as carriers for VAM inocula. In their experiments, four methods of inoculation were used—generally mixing the inoculum into the soil of potted plants; placing the inoculum directly beneath the root system of the cutting; dipping the root system into a slurry of "Terrasorb" which is a starch hydrolyzed polyacrylonitrile polymer using potassium hydroxide (manufactured by Industrial Services International, Bradenton, Fla.) at 1.5 g/100 mL water; and dipping the root system into a slurry of Viterra plant gel (comprised of potassium propenoate copolymers (manufactured by Nepera Chemical Company, Harriman, N.Y.) at 1 g/100 mL water. The particular polymers and dipping protocols used in the Johnson article are said to have resulted in lower inoculation levels than the alternative processes known in the art. In addition, the article by Beswetherick, J. T. et al., *Trans. Br. Mycol. Soc.* (1987) 89:603-605 describes the inoculation of roots with VAM by sandwiching the roots between squares of cellophane to which the fungal mycelium has been attached and references a number of other prior art techniques for inoculation.

Hwang, *Plant Disease* (1988) 72:448-452, describes the treatment of seeds with the fungicide metalaxyl followed by planting in soil inoculated with a VAM fungus. Groth et al., *Plant Disease* (1983) 67:1377-1378, describes the effect on plant growth of using soil treated with both metalaxyl and VAM fungi. Strider, *Plant Disease Reporter* (1977) 61:746-748, describes the use of benomyl in a root dip to help control Rhizoctonia root rot. German Democratic Republic Patent No. 128,396 (1977), is directed to method of controlling root diseases of cereals by coating the seeds with a nutrient substrate for antagonistic microflora and a fungicide. Leong, *Ann. Rev. Phytopathol.* (1986) 24:187-209, is a review of the role of siderophores in the biocontrol of plant pathogens. Melero-Vara et al., *Plant Disease* (1982) 66:132-135, is directed to a seed dressing containing metalaxyl to control downy mildew.

It is also known to coat the roots of seedlings during transplantation with a polymeric material to, for example, prevent desiccation. See, e.g., Hamilton et al., *Tobacco International* (1982) 184:88-91; Federal Republic of Germany Patent No. 1,945,110 (1970); Japanese Patent No. 57/083230 (1982); Japanese Patent No. 54/117734 (1979). In addition, U.S. Pat. Nos. 4,434,231 and 4,755,468, both to Jung, disclose crosslinking of polymer vehicles used to coat root systems by various means. Crosslinking, however, may suppress spore germination and infection.

Despite significant study of both the promotion of beneficial VAM fungi and the prevention of infection by plant pathogens, a continuing need exists for an improved, economical treatment of plants to promote growth and increase survival among transplanted seedlings. Several such methods are offered in the present invention.

DISCLOSURE OF THE INVENTION

In one approach to the problem of selectively encouraging VAM infection, it has been surprisingly discovered that plant roots, coated by treatment with an aqueous composition which contains a polymer formulation, VAM propagules and a fungicide that selectively inhibits pathogenic fungal infection, show growth that is superior to that observed after treatment with either VAM or fungicides alone. Particularly surprising is the superior performance of the plants of the invention in view of the markedly reduced application of fungicide compared to prior art techniques wherein an entire field is treated. Thus, the invention provides for the economical application of fungicides at a cost per plant attractive relative to fumigation and without a sacrifice in performance.

In another approach, the invention is directed to methods to obtain plant roots coated with a polymer formulation containing VAM propagules alone where these methods employ use of the dry polymer to obtain inoculation.

In the aspect related to the fungicide-containing inoculum, the invention is directed to a composition for coating roots of plants comprising an aqueous solution or suspension of: (a) a polymer capable of forming a non-phytotoxic coating on said roots; (b) VAM propagules capable of establishing infection of said roots upon the formation of said coat; and (c) a fungicide capable of selectively inhibiting root infection by a pathogenic fungus relative to infection by VAM.

In a related aspect, the invention is directed to a method of forming a growth-promoting polymer coating on the roots of a plant comprising: (a) providing the above-described root coating composition; and (b) coating roots with the above composition to provide coated roots.

In this regard, also, the invention is directed to a plant having a non-phytotoxic coating on its roots comprising a polymer, VAM propagules that provide for the infection of said roots, and a fungicide that selectively inhibits pathogenic fungi from infecting said roots, and to a plant having a non-phytotoxic coating on its roots comprising a polymer and a fungicide that selectively inhibits pathogenic fungi from infecting said roots, wherein said roots are also infected by a VAM fungus.

This aspect of the invention includes kits for the manufacture of a plant growth-promoting root coating composition comprising the components: (a) a polymer that can form a non-phytotoxic coating on plant roots, (b) VAM propagules, and (c) a fungicide that selectively inhibits root infection by a pathogenic fungus relative to infection by a VAM fungus, wherein said components are provided in predetermined quantities that upon admixture of all of the components and a predetermined amount of water, an aqueous suspension or solution is formed capable of forming said root coating, providing for VAM fungal infection of said roots, and inhibiting the infection of said roots by said pathogenic fungus.

With respect to providing a polymeric coating which encourages VAM infection from a dry polymer, one aspect of the invention is directed to a dried composition of hydrophilic polymer containing VAM propagules, including spores, which is obtained by coating the mixture onto flexible surface and drying. The dried composition can then be peeled from the surface and used for wrapping root systems. In the method of the invention using these flexible polymer/spore sheets, the sheets are attached to the roots.

In an alternative aspect, the dry polymer is spread as a powder on impermeable inelastic surfaces and the roots are coated by rolling the roots in the polymeric dry powder. This is followed by providing the root with spores or other infectious particles by dipping in an aqueous suspension.

As above, in related aspects, the invention is also directed to the plants which have been inoculated by these methods, and to compositions useful in conducting them.

These and other embodiments of the present invention will be readily apparent to those skilled in the art from the following description.

MODES OF CARRYING OUT THE INVENTION

In describing the invention, the following terms will have the indicated meanings.

"Non-phytotoxic" (as applied to the polymers herein) refers to the property of not causing plant death or serious injury. When used in reference to a coating on the roots, non-phytotoxic means that a coating is capable of application to a plant in a manner which does not cause substantial toxicity (e.g., statistically significant reduction in growth rate). Such toxicity can be measured, for example, by greenhouse trials comparing the growth of plants with various formulations of the polymer to controls that are not polymer coated. A coating is not phytotoxic if there is no statistically significant toxicity of the coating alone, or there is offset of any significant toxicity by growth-promoting components that can be included in the coating composition.

The term "hydrophilic" is so used to describe some of the polymers used in the invention. As used herein, the term "hydrophilic" means that the polymer is sufficiently compatible with water that it is capable of permitting water to permeate a coating of the dried polymer. The polymer itself may not readily be soluble in water. However, the hydrophilicity must be sufficient to permit aqueous solutions to cross the barrier it forms. Some of the polymers disclosed herein are also "biodegradable" and are thus capable of disappearing from the environment, although this may take some considerable time.

In addition, for those polymers used in the method of the invention wherein the dried polymer film must form a flexible coating, the nature of the polymer must be such that it can provide a flexible film capable of being wrapped around the root stem. Some polymers which are satisfactory when used in dried form, for example, when rolled on as a powder to the root, would not be satisfactory as films because their physical properties do not permit the formation of the desired film for use in the root wrapping approach. The ability of the polymer to be a "flexible film-forming" polymer in this context can readily be determined experimentally. All that need be done is to coat a solution of the polymer on an inert surface, such as the teflon-coated aluminum foil described hereinbelow, dry the coated material, and ascertain whether the resulting layer can readily be peeled to form a flexible film.

Thus, non-phytotoxic hydrophilic polymers suitable for the various invention methods include water-permeable and biocompatible polymers which form a coating that is only partially water soluble but sufficiently hydrophilic to be water permeable. The solubility must be such that the polymer is at least resistant to solubilization for a time period sufficient to allow VAM infection to be established before infection by root pathogens. Examples of such polymers include polyvinyl alcohol, polyvinyl pyrrolidone, polyacrylamide, polyvinyl acetate, polyvinyl propionate, hydroxypropyl methylcellulose, methylcellulose, and carboxymethylcellulose. Gums may also be used as the polymer in the formulations of the present invention, particularly xantham gum and gum arabic. Starch, particularly copolymers of starch with acrylamides, can also be used. The polymers used in all approaches of the present invention can be homopolymers, copolymers, or coformulations of two or more polymers. See, for example, Japanese Patent No. 57083230 (1982); Japanese Patent 54117734 (1979), Federal Republic of Germany Patent No. 1,945,110 (1970); German Democratic Republic Patent No. 128,396 (1977); and Heinrich (1977) Informations Foret (No. 4; 94) pp. 159–166.

Although all of the invention approaches require polymers with the foregoing characteristics, only the method which comprises wrapping the root in a flexible film requires the additional characteristics of the capability of forming such a flexible film. It is established that certain of these polymers, specifically methylcellulose (MC) and hydroxypropyl methylcellulose (HPMC) can be used in this manner.

"VAM" fungus or fungi as used herein refers to one or more members of the art-recognized class of vesicular arbuscular mycorrhizal (VAM) fungi. VAM fungi are also known in the art as VA mycorrhizal fungi. Many VAM genera have been identified, including, but not limited to, Acaulospora, Endogone, Gigaspora, Glaziella, Glomus, Modicella, Complexipes, and Entrophospora. Particularly important VAM genera are Gigaspora and Glomus. Examples of Glomus species include, but are not limited to, *G. intraradices, G. etunicatum, G. mosseae, G. fasciculatum, G. deserticola, G. macrocarpum, G. microcarpum, G. constrictum*. Examples of Gigaspora species include, but are not limited to, *G. margarita, G. gigantea, G. decipiens, G. gregaria, G. calospora* and *G. nigra*. See generally, Trappe (1982) Phytopathology 72:1102–1108; *VA Mycorrhiza* (Conway et al. eds. 1984); *Methods and Principals of Mycorrhizal Research* (Schenck ed. 1982).

"VAM propagules" refers to any infectious agent or composition capable of inducing VAM infection in plant roots. Thus, VAM propagules can include, but are not limited to, VAM spores, VAM hyphae, VAM hyphal tips, and VAM-infected root tissue.

An agent is "capable of selectively inhibiting" or "selectively inhibits" the growth of a first organism relative to a second organism when, in controlled studies, there is a level of application of the agent to both organisms that results in a statistically significant reduction in growth rate or infectivity of the first organism relative to the second organism. As used herein, "infection" can also mean colonization where appropriate to the symbiotic relationship involved.

Aqueous Compositions

The root coating formulations of the invention which are aqueous solutions or suspensions contain three primary components: a polymer capable of forming a nonphytotoxic root coating, VAM propagules, and a fungicide which is selectively active on at least one pathogenic plant fungus, but does not prevent the infection of plant roots by the VAM propagules. In formulating these compositions used by dipping roots to effect inoculation, the amount of polymer formulated will vary widely and the selection of an appropriate level is within the skill of the art. The amount employed will depend primarily on the polymer selected, and its biocompatibility with a selected plant. In general, however, the polymer (or polymers) will constitute from about 0.5% to about 20% (w/w) of the root coating compositions (however, concentrations outside this range could be possible without departing from the scope of the invention). More typically, the polymer(s) will constitute from about 1% to about 15% (w/w) of the aqueous coating composition. Examples of suitable ranges for specific polymers include: polyvinyl alcohol, from about 2.5% to about 13% (preferably about 8%); polyvinyl pyrrolidone, from about 1% to about 5% (preferably about 2.5%); polyacrylamide, from about 1% to about 4% (preferably about 2%); hydroxypropyl methylcellulose, from about 1% to about 4% (preferably about 2%); and methylcellulose, from about 1% to about 5% (preferably about 2.5%). Generally, pH adjustment has not been necessary and is not critical. Preferably, the pH should be maintained between from about 4 to about 9.

Fungicides employed in these compositions can be any agent, including a chemical or biological agent, that selectively inhibit the infection or growth of a plant pathogen or fungus relative to VAM, particularly in the root zone, when formulated into the root coating compositions at an effective concentration. The identification of chemical agents that selectively inhibit root pathogens, such as *Pythium spp., Rhizoctonia spp., Phytophthora spp.*, or *Fusarium spp.*, is known in the art. See, e.g., Menge, *Phytopathology* (1982) 72:1125–1132. Particularly preferred chemical fungicides are aluminum tris(—O-ethyl phosphonate)[fosetyl Al; Aliette ™], and N-(2,6-dimethylphenyl)-N-(methoxyacetyl)-alanine methyl ester [metalaxyl; Ridomil ®]. Some chemical fungicides may be selective only at reduced concentrations, such as captan. See, e.g., Nemec, *Can. J. Bot.* (1980) 58:522–526; Sutton et al., *Can. J. Bot.* (1976) 54:326–333.

Biological fungicides comprise any organisms, such as bacteria, fungi, or viruses, that provide for the selective inhibition of fungal pathogens relative to VAM fungi when included in the root coating compositions of the present invention. The selective inhibition can be induced either directly (e.g., toxicity to fungal pathogen), or indirectly (e.g., competition, inducing plant immunity, etc.). Particularly preferred biological fungicides are microorganisms such as bacteria that produce siderophores. Such bacteria are well known in the art. See, e.g., Leong, *Ann. Rev. Phytopathol.* (1986) 24:187–209; Gill et al., *J. Bacteriol.* (1988) 170:163–170; Buyer et al., *J. Biol. Chem.* (1986) 261:791–794; and deWeger et al., *J. Bacteriol.* (1986) 165:585–594. Particularly preferred are growth-promoting *Pseudomonas spp.* Fungicidal strains are typically of the *Pseudomonas fluorescens-Pseudomonas putida* group that rapidly colonize plant roots and cause statistically significant increases in plant yield. See, e.g., Schroth et al., *Science* (1982) 216:1376–1381. Suitable strains of Pseudomonas isolated from the rhizosphere can be identified by screening for fungal inhibition. See, e.g., Gill et al. (1988), supra. Suitable Pseudomonas strains are also available commercially (e.g., Dagger ™ G; Ecogen Inc., Langhorne, Pa.).

The amount of fungicidal agent included in the root coating formulations will also vary widely depending upon the activity of the specific agent employed. Selection of appropriate concentrations is within the skill of the art. Concentrations of fungicidal agent can be optimized by screening. It is usually convenient to initially formulate the root compositions with a concentration approximating the concentration of the fungicidal agent when applied in the field. Higher and lower concentrations can then be screened for optimization. In the absence of prolonged soaking, the root coatings described herein do not typically result in the high levels of fungicide in cortical tissue which may result from soaking roots for prolonged periods in fungicide solutions.

The amount of VAM propagule included in the aqueous root coating compositions may vary widely. The only requirement is that sufficient propagule be included to provide for infection of the plant's root. The selection of the appropriate amount is within the skill of the art. For *G. intraradices*, the amount of propagule is selected to provide, for example, a concentration of about 1,000 spores/ml to about 30,000 spores/ml in the coating composition. For each VAM fungus and propagule source, however, it will usually be advisable to optimize the concentration by routine screening of various levels in the coating.

The coating formulation of the present invention can optionally contain additional plant growth adjuvants. Examples of such adjuvants include growth regulators, such as ascorbic acid (AA), gibberellic acid (GA) and indoleacetic acid (IAA) [see, e.g., Patil et al., *Indian J. Plant Physiol.* (1981) 24:145–149], or microorganisms with the ability to solubilize mineral phosphates. See, e.g., Goldstein, *Amer. J. Alternative Agriculture* (1986) 1:51–57; Shingte et al., *J. Maharashtra Agric. Univ.* (1987) 12:121–122. The addition of such adjuvants, as well as other agents into the root coating formulations of the present invention, is within the skill of the art.

The aqueous root coating compositions described above can be prepared for immediate use with applicable concentrations of the active components for direct application to root tissue. Alternatively, the root coating compositions can be formulated into a kit which preferably only requires the addition of a predetermined amount of water. The kit will generally comprise a single package comprising one or more containers holding predetermined quantities of polymer, VAM propagules, and fungicide. Each of the three components can be held individually in separate containers, or two or more of the components could be combined into a single container. The division of the various components between individual containers will depend primarily upon stability of the individual components placed in contact with each other. Depending on the particular polymer, VAM propagules and fungicide selected, the components could be dry or liquid formulations. Typically, however, the polymer and the fungicide will be liquid compositions, and most likely formulated together into a single container. The VAM propagules could comprise, for example, dried spores or hyphae, or fresh or dried VAM-infected root tissue. In its simplest form, the kit can comprise a package containing a single container containing a concentrated aqueous solution of the polymer, VAM propagules and the fungicide merely requiring dilution to a working concentration. Typically, the kit will also include instructions on how to formulate the components of the kit into a coating composition of the correct concentration, and preferably instructions for the method of coating roots described below.

Dry Polymer Methods

In an alternate approach to conferring the beneficial VAM infection on plants, the propagules are furnished in the context of a dry polymeric coating. The dry coating can be formulated so as to contain the propagules in a single formulation, or the root may first be coated with the dry polymer as a powder and then treated with a suspension of the propagules. In either event, the polymer component of the coating is supplied in a dry form.

In a first approach, the non-phytotoxic hydrophilic polymer, which has the additional property of being capable of forming a flexible film is used to contain the VAM propagules, with or without the inclusion of fungicides and/or other adjuvants and stabilizers as described above. The choice of the appropriate polymer will be determined by its physical properties in permitting it to form a flexible film as well as the required characteristics of sufficient hydrophilicity for water permeability, non-phytotoxicity and sufficient biodegradability to permit practical use. It is demonstrated herein that certain polymers, including methylcellulose (MC) or hydroxypropyl methylcellulose (HPMC), have these properties.

For preparing the films, these polymers are dissolved in sterilized water at a suitable percentage range, typically 1–5% wt/wt. The pH of the resulting solution does not appear to be critical within a wide range, and as stated above, approximately 4–9 is satisfactory; preferably the final pH is of 4.5–7. To form the VAM-containing film, the polymer suspension or solution is placed on a flexible and inert support from which it can easily be detached, such as teflon-coated aluminum foil. Any convenient dimensions of the sheet supporting the film can be used. The solution or suspension is evenly dispensed onto the sheet; any convenient method can be used, such as coating by even dispensation with a pipette, coating and spreading, or spraying. A suspension of the VAM propagules is then added to the wet polymer film by any convenient methodology. A suitable number of propagules is used, and can be determined experimentally. It has been found that, in the illustrated procedure below, more than 100 spores or propagules per $0.5 \times 0.5''$ area can be effective, and concentrations of approximately 500 or more spores per $0.5 \times 0.5''$ area result in 100% of the roots being infected. Higher amounts of propagules can also be used. The propagules can be applied as individual "spots" or can be spread over the entire surface. Any convenient geometry can be employed. The films are then allowed to dry until the moisture content is relatively low, for example for 48 hours at 60°–70° F. The film formed on the surface of the support is then peeled off, and cut to obtain the pieces of suitable size having the required inoculum. While some fine tuning will be necessary in each individual case, it appears that, for example, a $0.5 \times 0.5''$ square containing approximately 500 propagules is typically useful.

The resulting film segments are then attached, usually one film per seedling. The film should be wrapped around the root in an area which is susceptible to infection and which is rapidly growing, such as that area immediately above the root tip. The root provides sufficient moisture to partially rehydrate the film.

In an alternate but related approach, the roots of seedlings are first rolled in the dry polymer and then dipped into an aqueous suspension of propagules at an effective concentration for infection, e.g., approximately 1,000/mL. The polymer or mixture of polymers is supplied as a powder on a flat surface and the root of the seedling rolled in the powder. A thin coating of powder is formed on the root. The root is then dipped into a spore suspension and replanted.

In this embodiment, the polymer used must be hydrophilic and non-phytotoxic, but does not, of course, need to have the additional capability of being able to form a thin flexible film. Any of the above-mentioned polymers can be prepared as a dry finely divided powder and used to provide a thin "flour-like" coating on the root. As is the case in attaching the film containing VAM propagules, the coating should at least cover the fast growing root area, and preferably the entire root. Upon treatment of the "flouted" root surfaces with the propagule suspension, sufficient rehydration apparently occurs to conduct the propagules to the root surface, and the polymer provides sufficient adhesive to maintain contact between the VAM propagules and the root surface. The seedlings are replanted as above and the growth and infection levels are monitored.

Plant Preparation

Regardless which of the three methods of inoculation is used, the plants are typically prepared as follows. A plant, usually a seedling or plantlet (i.e., immature plant with roots, stem and leaves), is removed from the soil in which it has been growing. Any soil clinging to the roots is removed by washing. It may also be desirable to sterilize the roots by soaking in a solution containing sodium hypochlorite at about 0.5 to 1% (v/v) for 20 seconds.

In the method comprising coating with an aqueous suspension, the root coating composition containing both propagules and fungicide is then applied by any convenient method. The coating is typically allowed to at least partially dry (a few seconds to a few minutes) to maintain the integrity of the coating if the plant is to be immediately transplanted. Alternatively, the dipped plant could be transferred directly to a cone or plug (e.g., agar, peat moss, soil, etc.).

A convenient method of applying the coating composition to the roots of a plant is to simply dip the cleaned roots into a container of the coating composition. Alternatively, the coating compositions of the present invention could be applied through spraying, for example, in an automated process. Preferably all of the root tissue is coated (e.g., at least 50%, preferably at least 75%, and most preferably about 90–100%). It is usually desirable to avoid coating the leaves or any substantial fraction of the plant stem which will be found above the soil line. In general, it is desirable to coat as much of the plant tissue as possible that will be in contact with the rhizosphere.

If dry polymer is used, the polymer is applied either in the context of a film to which a propagule suspension has been added, or is rolled in dry form onto the surface of the root followed by dipping into the propagule suspension. In any case, the prepared root with the film attached in contact with the appropriate portions of the root or having a coat formed from dry polymer powder and dipping in propagule suspension is replanted or transferred directly to a cone or plug as described above.

The root coatings of the present invention have applicability to a wide variety of plants. It appears that VAM fungi can colonize the roots of over 90% of all plants. The present invention will have particular application in economically important agronomic and horticultural crops which are subjected to transplantation. Table 1 lists representative crops which can benefit from VAM colonization, such as that provided by the present invention. The list in Table 1 is representative, but not exhaustive.

TABLE 1

Crops Colonized by VAM

Fruit and Nut Crops:

| Almond | Date Palm | Pear |
| Apple | Fig | Pecan |
| Apricot | Grape | Pineapple |
| Avocado | Kiwi | Pistachio |
| Blackberry | Melon, All | Raspberry |
| Cherry | Olive | Strawberry |
| Citrus, All | Papaya | Walnut |
| Currant | Peach | |

Vegetable Crops:

| Artichoke | Cucumber | Pepper, All |
| Asparagus | Eggplant | Potato |
| Beans, All | Garlic | Squash |
| Carrot | Lettuce | Tomato |
| Cassava | Okra | Yam |
| Celery | Onion | |

Agronomic Crops:

| Alfalfa | Cotton | Soybean |
| Cereal Grains | Peanut | Sunflower |
| Clover | Rice | Wheat |
| Corn | Tobacco | |

Ornamental Crops:

| Agapanthus | Boxwood | Cedar |
| Araucaria | Carrisa | Cotoneaster |
| Barberry | Ceanothus | Cupressus |

TABLE 1-continued

Crops Colonized by VAM

| Dogwood | Liriodendron | Russian Olive |
| Fern | Mahonia | Sweet Gum |
| Forsythia | Maples, All | Sycamore |
| Gardenia | Palms | Taxus |
| Green Ash | Photinia | Viburnum |
| Holly | Pittosporum | Vinca |
| Juniper | Podocarpus | Xylosma |
| Ligustrum | Raphiolepis | Boston fern |
| Staghorn ferns | | |

Flower Crops:

| Chrysanthemum | Bulbs, All | Fuschia |
| Petunia | Roses, All | Morning Glory |
| Marigold | Snap Dragons | Nasturtium |
| Begonia | Impatiens | Geranium |

The following is a list of specific plant species which are often transplanted and can benefit from the application of root coatings according to the present invention:

*Cucumis spp.* (melon)
*Vitis spp.* (grapes)
*Apium spp.* (celery)
*Fragaria spp.* (strawberry)
*Citrus spp.* (orange, lemon, lime, etc.)
*Camellia spp.* (e.g., *C. sinensis;* tea)
*Solanum spp.* (e.g., *Nicotiana tabaccum* tobacco)
*Oryza spp.* (rice)
*Begonia spp.* (Begonia rex)
*Lycopersicon spp.* (tomato)
*Asparagus spp.* (asparagus)
*Cynara spp.* (artichoke)
*Nephrolepis spp.* (e.g., *N. exaltata;* Boston fern)
*Davallia spp.* (ferns)
*Platycerium spp.* (staghorn ferns)
*Malus spp.* (apple)
*Prunus spp.* (e.g., *P. avium;* sweet cherry)
*Rubus spp.* (e.g., *R. idaeus,* raspberry; *R. laciniatus,* blackberry)
*Pyrus spp.* (pear)
*Carya spp.* (e.g., *C. illinoinensis;* pecan)
*Allium spp.* (onion)
*Gossypium spp.* (cotton)
*Tulbaghia spp.* (agapanthus)
*Buxus spp.* (boxwood)
*Cedrus spp.* (cedar)
*Comus spp.* (dogwood)
*Acer spp.* (maple)
*Areca spp.* (palm)
*Phoenix spp.* (palm)
*Pittosporum spp.* (pittosporum)
*Rosa spp.* (rose)
*Chrysanthemum spp.* (chrysanthemum)

The following examples are provided for illustrative purposes only and are not intended to limit the scope of the invention in any way. All publications cited herein are expressly incorporated in this disclosure.

EXAMPLE 1

Coating with Aqueous Suspension

*Glomus intraradices* was formulated into a polymer composition comprising 8% (w/w) polyvinylalcohol (PVA) and 100 ppm metalaxyl. PVA was dissolved in water (Millipore filtered) at 80° C. in a ratio of 8g:92g. A current of 1.5 amps was run through the water for 20 mins to aid in dissolving the polymer. The solution was then cooled to room temperature. Spores were collected by grinding infected Sudan grass or alfalfa roots in an Omnimixer, and then wet sieving the material through 355 micron and 45 micron (325 mesh) screens to remove debris. Spores were then concentrated with a sucrose gradient (20/40/60%).

To 1 l of 8% PVA solution was added 400 ul of Subdue 2E ® (Ciba-Geigy, 25.1% metalaxyl). 30 ml of the PVA/metalaxyl solution was then mixed with at least about 30,000 VAM spores. Seedlings were then dipped in the solution while maintaining constant mixing for even spore distribution. The excess material was allowed to drip off the roots, and seedlings were then planted.

Ten-day-old and thirty-day-old onion seedlings (*Allium cepa*) were removed from sterile soil and dipped in the coating composition described above. They were then transplanted into non-fumigated soil containing native soil microflora, including indigenous VAM fungi. The percentage of average VAM infection was measured 2, 3 and 4 weeks post-transplantation for plants treated with the coating composition described above, and compared to plants which were (1) untreated (control), (2) inoculated with a concentrated spore suspension of *G. intraradices*, (3) dipped in a solution containing the same concentration of polymer alone, and (4) dipped in a solution containing the same concentration of VAM and polymer, but without any fungicide. The results are shown in Tables 2 and 3. As can be seen, the levels of VAM infection were significantly higher in plants treated with a coating composition according to the present invention.

TABLE 2

10 Day Old Onion

| Treatment | Average VAM % Infection | | |
|---|---|---|---|
| | 2 Weeks | 3 Weeks | 4 Weeks |
| Control* | 6 | 14 | 8 |
| G.I. | 11 | 21 | 17 |
| PVA | 11 | 20 | 13 |
| PVA & G.I. | 11 | 6 | 18 |
| PVA & Met & G.I. | 31 | 32 | 36 |

*Measured infection presumed due to indigenous VAM
G.I. = *G. intraradices*
PVA = polyvinyl alcohol
Met = metalaxyl

TABLE 3

30 Day Old Onion

| Treatment | Average VAM % Infection | | |
|---|---|---|---|
| | 2 Weeks | 3 Weeks | 4 Weeks |
| Control* | 12 | 12 | 10 |
| G.I. | 15 | 22 | 13 |
| PVA | 4 | 12 | 13 |
| PVA & G.I. | 15 | 20 | 29 |
| PVA & Met & G.I. | 26 | 42 | 44 |

*Measured infection presumed due to indigenous VAM
G.I. = *G. intraradices*
PVA = polyvinyl alcohol
Met = metalaxyl

EXAMPLE 2

Attachment of VAM-Containing Flexible Film

A film containing VAM propagules was prepared as follows: methylcellulose (MC) and hydroxypropyl methylcellulose (HPMC) were dissolved at 2.5% wt/wt in Millipore-filtered water to obtain a solution with a final pH of 4.5-7.

To form the film, 100 ml of each polymer-containing solution was spread onto an 8×12" teflon-coated aluminum foil sheet to obtain an evenly distributed thin film. The VAM propagules were then added to the wet polymer film using a Pipetman in dollops which resulted in areas of approximately 0.5×0.5" containing spores. Varying amounts of VAM propagules per 0.5×0.5" defined area were used, from 0 propagules-2,000 propagules. The films were then allowed to dry for 48 hours at 60°-70° F. in the open air.

After this drying period, the water content of the dried HPMC was approximately 4.3% and that of the methylcellulose approximately 8.2%. Both formed a film of sufficient integrity that it could be removed by peeling the film away from the backing.

The dried film was then cut into the designated 0.5×0.5" squares containing the aliquoted inoculum.

For application to the plants, 10 day old onion seedlings were removed from the soil and cleaned. One half inch square film was attached per seedling in an area of high root proliferation and high infection probability—i.e., behind the zone of elongation.

These seedlings were then replanted in a sand/clay/vermiculite mix. After eight weeks the plants were harvested and the plant fresh weight and the extent of infection were determined.

Using *G. intraradices*, an internal spore former, as the inoculum, it was found, after eight weeks, that plants inoculuated with film pieces which contained 100 spores per film or more were significantly larger than the controls as measured using Duncan's multiple range test (DMRT), those inoculated with 500 or more spores were larger than those with 100. Those inoculated with 50 spores were not significantly different in size from controls which contained no spores.

For plants inoculated with films containing 500 or more *G. intraradices* spores per film, 100% of the plants were infected; when 100 spores per film was used, 61% were infected; only 50% of the plants which contained films having 50 spores per film were infected. The "average infection" was in all cases relatively high—i.e., 50–67%. (The "average infection" refers to the percentage of the covered root area which was stained and found to contain the desired VAM infection.)

These results are summarized in the following table:

TABLE 4

| | Fresh Weight (g) and Infection | | |
|---|---|---|---|
| Treatment* | Mean Wt. | % of Plants Infected | Avg. % Infection |
| 2000 spores/film | 1.49 | 100 | 67 |
| 1000 spores/film | 1.64 | 100 | 67 |
| 500 spores/film | 1.55 | 100 | 65 |
| 100 spores/film | 0.59 | 61 | 60 |
| 50 spores/film | 0.23 | 50 | 50 |
| Film Control | 0.13 | 0 | 0 |
| Plant Control | 0.11 | 0 | 0 |

*Twenty replicates per treatment.

A similar experiment substituting *G. mosseae*, an external spore former, for *G. intraradices* also resulted in plants which were significantly larger than the controls as judged by DMRT, when at least 100 spores per film were used. In this case, the percentage of plants infected was 69% and the average percent infection was 50%.

(In a preliminary experiment to test the efficacy of the method, 17 day old onion seedlings were treated with films as described above using 100 propagules per film. The plants were harvested after two months in the greenhouse, and the roots were weighed and stained and examined for the extent of VAM infection and colonization. The results of this experiment are shown in Table 5.

TABLE 5

| | Polymer Film Delivery Method on 17-Day-Old Onion Seedlings | |
|---|---|---|
| Treatment | No. Plants Infected/ Total No. Plants | Average Percent Infection |
| MC + VAM | 17/36 (47.2%) | 25 |
| HPMC + VAM | 6/36 (16.7%) | 29 |

As shown above, better results were obtained upon more experience with the protocol.

It appears that the VAM viability in the films is somewhat limited. The films are capable of being stored for about 4 weeks. Stabilizers added to the film may improve this shelf life.

EXAMPLE 3

Dry Polymer Rolling Method

In this experiment, 10 day old onions were uprooted and cleaned. Hydroxypropyl methylcellulose was provided as a dry polymer and spread on a hard surface. The roots of the onions were rolled in the polymer and then dipped in a suspension of either *G. intraradices* (GI) spores at 1,000/ml, or whole inoculum at 1,000 propagules/ml, or *G. deserticola* (GD) spores or whole inoculum at 1,000/mi. The roots were completely covered with the powdered coat, and then dipped for their entire length in the suspension. The seedlings were replanted and harvested after 8 weeks.

After 8 weeks, the plants were harvested and examined for infection and the extent thereof. Because of the proximity of the controls and the VAM inoculated pots in the greenhouse, some cross-contamination did occur, accounting for the infection of some controls. The results of the determination are shown in Table 6.

TABLE 6

| | Infection of 10-Day-Old Onions Using HPMC as the Dry Polymer Precoat | |
|---|---|---|
| Treatment | Number of Plants Infected | Range % Infection (Average) |
| GI whole inoculum | 16/16 = 100% | 50.76–89.17 (75.1%) |
| GI spores | 17/17 = 100% | 4.83–90.91 (67.8%) |
| GD whole inoculum | 17/18 = 94.45% | 11.8–98.3 (80.78%) |
| GD spores | 9/20 = 45% | 15.6–94.4 (80.5%) |
| HPMC control | 9/20 = 45% | 11.67–31.9 (22.1%) |
| Plant control | 2/20 = 10% | N.A. |

High levels of infection (in terms of percent average infection) were obtained for all types of inocula.

While the invention has been described above in some detail for purposes of clarity of understanding, it is to be understood that the invention is not limited thereby, and is to be defined by the scope of the following claims.

We claim:

1. A method for forming a growth promoting polymer coating on the roots of a plant which method comprises rolling the roots of the plant in a powder of dry hydrophilic non-phytotoxic polymer; removing the roots from the powder, and dipping the powder-coated roots into a aqueous suspension of VAM propagules at a concentration effective to promote infection.

2. The method of claim 1 wherein said polymer is selected from the group consisting of polyvinylalcohol, polyvinylpyrrolidone, polyacrylamide, hydroxypropyl methylcellulose, carboxymethyl cellulose and methyl cellulose.

3. The method of claim 1 wherein said plant is selected from the group consisting of: *Malus spp., Prunus spp., Fragaria spp., Rubus spp., Pyrus spp., Carya spp., Apium spp., Allium spp., Gossypium spp., Tulbaghia spp., Buxus spp., Cedrus spp., Cornus spp., Acer spp., Areca spp., Phoenix spp., Pittosporum spp., Rosa spp., Citrus spp., Vitis spp., Camellia spp., Cucumis spp.,* and *Chrysanthemum spp.*

4. The method of claim 1 wherein said plant is a seedling.

5. The method of claim 1 wherein said VAM propagule is selected from the group consisting of Gigaspora and Glomus.

6. The method of claim 5 wherein said VAM is Glomus.

7. The method of claim 6 wherein said Glomus is selected from the group consisting of *G. intraradices, G. deserticola* and *G. mosseae.*

8. A plant product with coated roots prepared by the method of claim 1.

9. A flexible polymeric film for coating the roots of plants to introduce VAM infection which film comprises dried film of a non-phytotoxic, hydrophilic, flexible film-forming polymer and VAM propagules at a concentration effective to introduce said infection.

10. The film of claim 9 wherein the VAM propagules are present at a concentration of at least 100 propagules per 0.5×0.5" of film.

11. The film of claim 9 wherein the polymer is selected from the group consisting of methylcellulose and hydroxypropyl methylcellulose.

12. The film of claim 9 wherein said VAM propagule is selected from the group consisting of Gigaspora and Glomus.

13. The film of claim 12 wherein said VAM is Glomus.

14. The film of claim 13 wherein said Glomus is selected from the group consisting of *G. intraradices, G. deserticola* and *G. mosseae.*

* * * * *

UNITED STATES PATENT AND TRADEMARK OFFICE
CERTIFICATE OF CORRECTION

PATENT NO. : 5,344,471
DATED : September 6, 1994
INVENTOR(S) : TUSE et al.

It is certified that error appears in the above-indentified patent and that said Letters Patent is hereby corrected as shown below:

On the title page item [73], change "SRI International, Menlo Park, Calif." to --Osaka Gas Co., Ltd., Osaka, Japan--

Signed and Sealed this

Fourteenth Day of March, 1995

Attest:

BRUCE LEHMAN

Attesting Officer

Commissioner of Patents and Trademarks